United States Patent
Lu et al.

(10) Patent No.: US 9,182,920 B2
(45) Date of Patent: *Nov. 10, 2015

(54) CHANNEL ACTIVATING METHOD AND PERIPHERAL DEVICE PERFORMING THE SAME

(75) Inventors: Po-Ching Lu, Tai-Chung (TW); Pao-Ching Tseng, Hsinchu County (TW); Chuan Liu, Hsin-Chu (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/784,490

(22) Filed: May 20, 2010

(65) Prior Publication Data

US 2010/0228899 A1 Sep. 9, 2010

Related U.S. Application Data

(63) Continuation of application No. 11/307,046, filed on Jan. 20, 2006, now Pat. No. 7,752,363.

(60) Provisional application No. 60/595,424, filed on Jul. 4, 2005.

(51) Int. Cl.
*G06F 3/06* (2006.01)

(52) U.S. Cl.
CPC ............ *G06F 3/0634* (2013.01); *G06F 3/0617* (2013.01); *G06F 3/0632* (2013.01); *G06F 3/0677* (2013.01)

(58) Field of Classification Search
CPC .... G06F 3/0632; G06F 3/0634; G06F 3/0677
USPC ........................................................ 710/260
See application file for complete search history.

(56) References Cited

U.S. PATENT DOCUMENTS

| | | | |
|---|---|---|---|
| 5,442,639 A | 8/1995 | Crowder | |
| 6,170,043 B1 * | 1/2001 | Hu | ................. 711/158 |
| 7,010,672 B2 | 3/2006 | Ahmad | |
| 7,587,294 B2 | 9/2009 | Cheong | |
| 2003/0115382 A1 | 6/2003 | Kimoto | |

(Continued)

FOREIGN PATENT DOCUMENTS

WO  WO 03063000 A1  7/2003

OTHER PUBLICATIONS

APT Technologies et al.; "Serial ATA: High Speed Serialized AT Attachment"; Serial ATA Work Group; Revision 1.0a; Jan. 7, 2003; all pages.*

*Primary Examiner* — Brian Misiura
(74) *Attorney, Agent, or Firm* — Winston Hsu; Scott Margo (57) ABSTRACT

A channel activating method and a peripheral device are provided for activating a serial transmission channel to retrieve at least one firmware instruction from a host. The peripheral device includes a serial transmission port coupled to the host, a microprocessor coupled to the serial transmission port for performing functions of the peripheral device according to the firmware instruction, a memory for holding the firmware instruction, a trigger generator for generating a trigger signal by monitoring a control signal received from the host via the serial transmission port, and a signal generator, coupled to the trigger generator, for generating an indication signal to the host via the serial transmission port according to the trigger signal to activate the serial transmission channel.

30 Claims, 9 Drawing Sheets

(56) References Cited

U.S. PATENT DOCUMENTS

| | | |
|---|---|---|
| 2004/0000996 A1 | 1/2004 | Addy |
| 2004/0193737 A1 | 9/2004 | Huffman |
| 2004/0252716 A1 | 12/2004 | Nemazie |
| 2005/0169356 A1* | 8/2005 | Matsumoto et al. .......... 375/220 |
| 2005/0229172 A1* | 10/2005 | Tu et al. ........................ 717/168 |
| 2005/0251588 A1 | 11/2005 | Hoch |
| 2005/0289364 A1 | 12/2005 | Strong |
| 2006/0080483 A1 | 4/2006 | Ogasawara |
| 2006/0277331 A1 | 12/2006 | Priborsky |

* cited by examiner

FIG. 1 PRIOR ART

|   | FEATURES | COMMAND | C | R | RESERVED(0) | FIS TYPE(27H) |
|---|---|---|---|---|---|---|
| 0 | | | | | | |
| 1 | DEV/HEAD | CYL HIGH | | | CYL LOW | SECTOR NUMBER |
| 2 | FEATURES (EXP) | CYL HIGH (EXP) | | | CYL LOW (EXP) | SECTOR NUM(EXP)(0) |
| 3 | CONTROL | RESERVED (0) | | | SECTOR COUNT (EXP) | SECTOR COUNT |
| 4 | RESERVED (0) | RESERVED (0) | | | RESERVED (0) | RESERVED (0) |

FIG. 2 PRIOR ART

|   | ERROR | STATUS | R | I | R | RESERVED(0) | FIS TYPE(34H) |
|---|---|---|---|---|---|---|---|
| 0 | | | | | | | |
| 1 | DEV/HEAD | CYL HIGH | | | | CYL LOW | SECTOR NUMBER |
| 2 | RESERVED(0) | CYL HIGH (EXP) | | | | CYL LOW(EXP) | SECTOR NUM(EXP)(0) |
| 3 | RESERVED (0) | RESERVED (0) | | | | SECTOR COUNT (EXP) | SECTOR COUNT |
| 4 | RESERVED (0) | RESERVED (0) | | | | RESERVED (0) | RESERVED (0) |

CHANNEL ACTIVATING METHOD AND PERIPHERAL DEVICE PERFORMING THE SAME

CROSS REFERENCE TO RELATED APPLICATIONS

This continuation application claims the benefit of co-pending U.S. patent application Ser. No. 11/307,046 (filed on Jan. 20, 2006) which claims the benefit of U.S. Provisional Application No. 60/595,424 (filed on Jul. 4, 2005). The entire contents of these related applications are incorporated herein by reference.

BACKGROUND

The invention relates to a channel activating method and a peripheral device for activating a physical channel between a host and the peripheral device, and more particularly, to the channel activating method and the peripheral device for activating the physical channel between the host and the peripheral device without the help of a microprocessor disposed in the peripheral device.

Serial advanced technology attachment (SATA) specifications are applied to a transmission interface between a host and a peripheral device, such as a hard disk drive or an optical disc drive. SATA specifications define two pairs of differential signals, which are different from the forty or eighty parallelized signals in the advanced technology attachment (ATA) specifications. When a system utilizes the SATA interface to communicate with other devices, the system would have the advantages of less pin counts, lower operation voltages and higher transmission rate. SATA specifications also include some new functions, such as flow control and retransmission, to perform simple control on a data stream.

Figure 1:
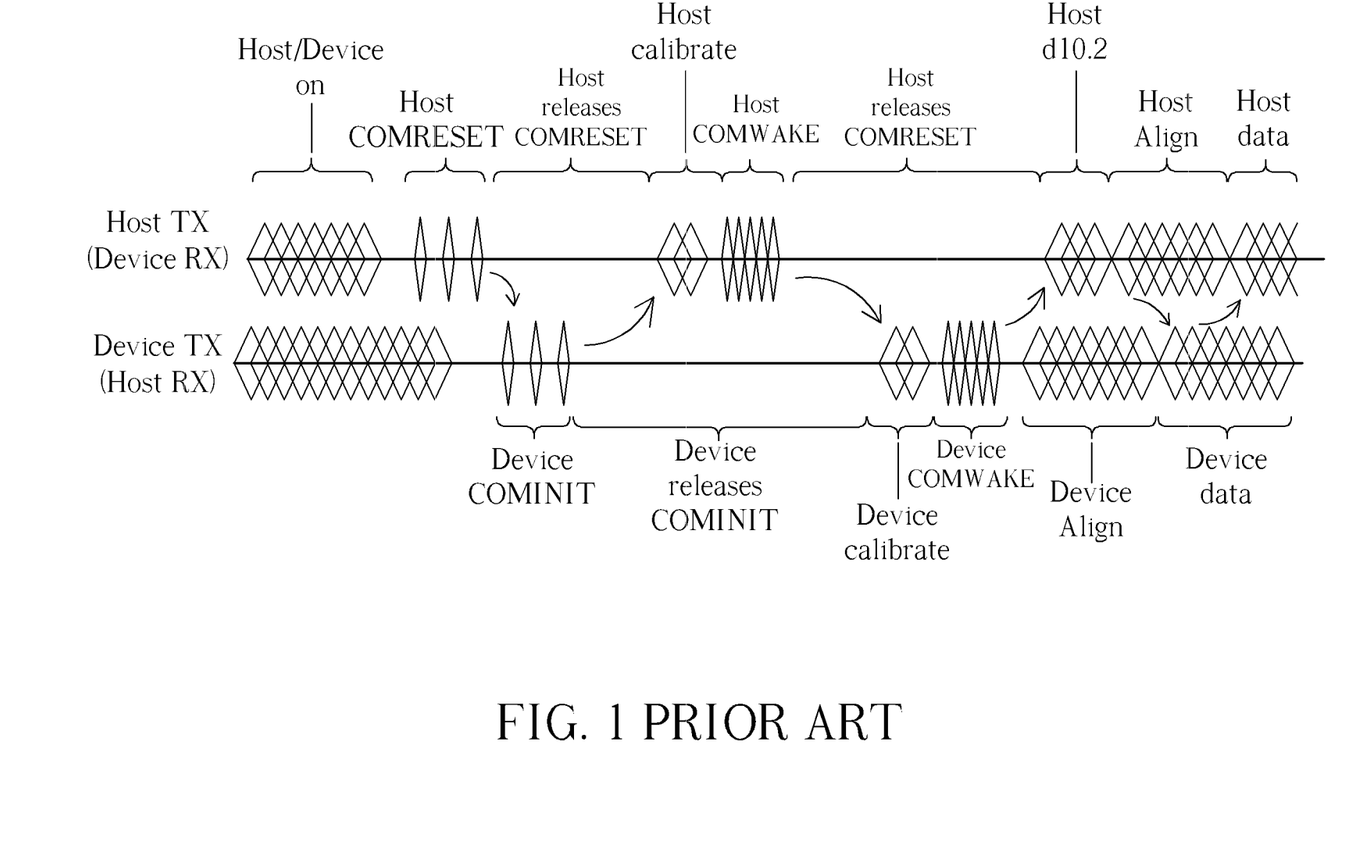
FIG. 1 is a schematic diagram of out of band (OOB) signals specified in the SATA specifications.

Referring to FIG. 1, which is a schematic diagram of out of band (OOB) signals specified in the SATA specifications. SATA specifications specify three OOB signals, which are COMRESET, COMINIT and COMWAKE, to make sure the differential and common levels of the signal lines shall comply with the SATA specifications for in-band data transmission. After the OOB sequence is completed, the communication link is established and normal operation may begin. And it is a state defined as Phy Ready state. When entering the Phy Ready state, the host and the peripheral device corresponding to two different sides of the physical channel are maintained to be synchronized with each other so that signals transmitted from one side of the physical channel are also valid to the other side of the physical channel.

Figure 2:
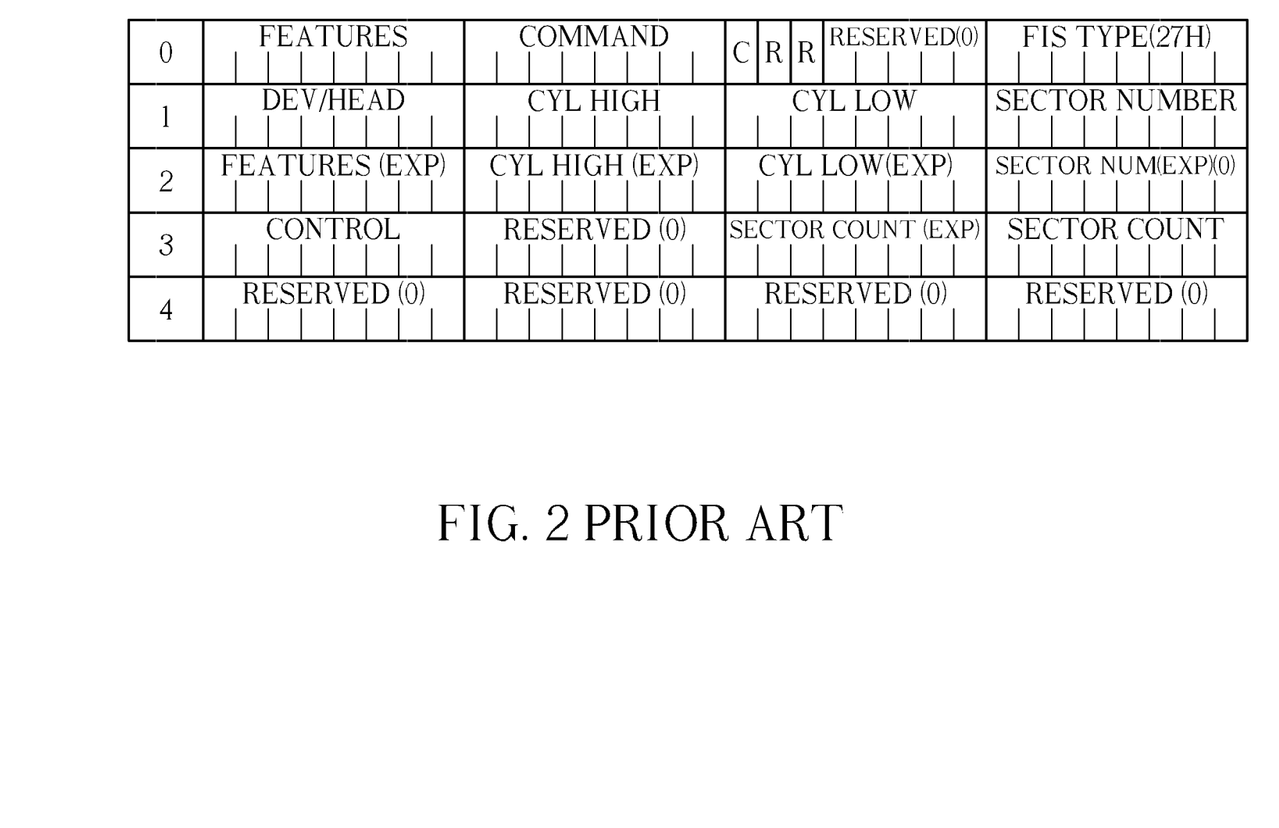
FIG. 2 is a host-to-device register FIS structure according to SATA standards.
Figure 3:
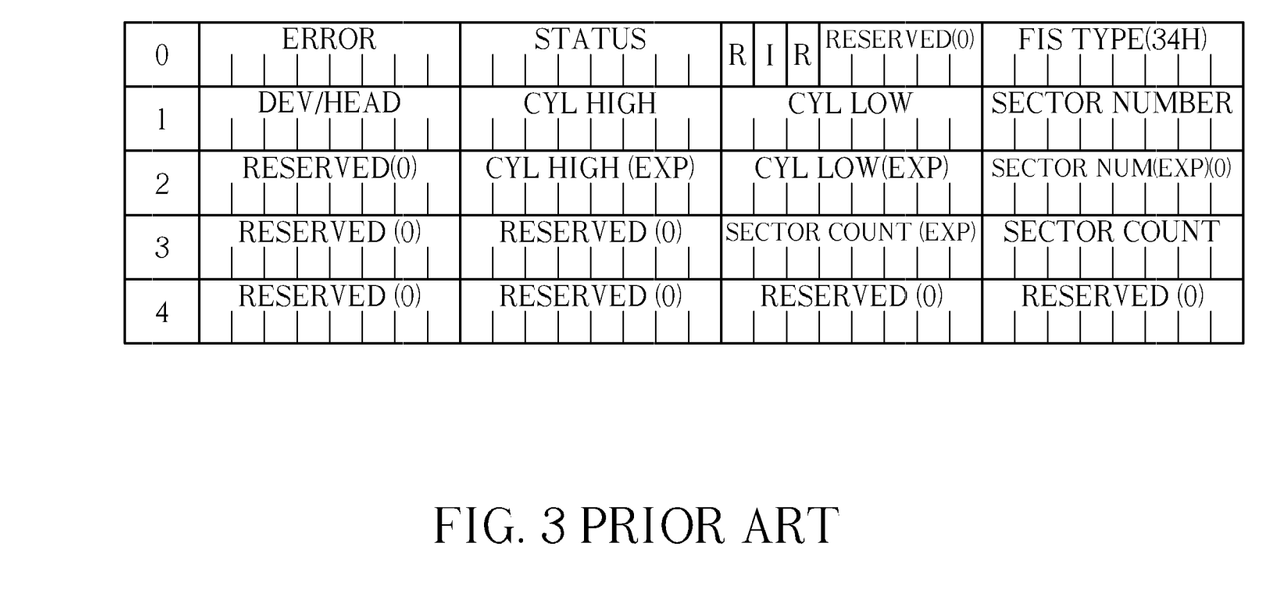
FIG. 3 is a device-to-host register FIS structure according to SATA standards

Please refer to FIG. 2 and FIG. 3 simultaneously. FIG. 2 is a host-to-device register FIS structure according to SATA standards while FIG. 3 is a device-to-host register FIS structure according to SATA standards. As the Phy Ready state mentioned above is achieved, the host is specifically prohibited from writing the Features, Sector Count, Sector Number, Cylinder Low, Cylinder High, or Device/Head registers, whose corresponding fields defined in a register FIS can be found on FIG. 2 and FIG. 3, until the peripheral device replies Register FIS to clear either value in BSY or DRQ field in the Status Register. Any writing to the Command Register when BSY or DRQ field is set is ignored unless the writing is to issue a Device Reset command. Please note that, according to the SATA specifications, BSY is set when the peripheral device is busy and is not available temporarily to the host while DRQ is set when the peripheral device is ready to transfer a word or byte of data between the host and the peripheral device.

Therefore, without Register FIS transmitted from the peripheral device to the host, the host will not be able to request the peripheral device to perform any operation and the peripheral device would be seemed as not available. Generally speaking, this is a status response problem and is usually performed under the control of firmware. Thus, to write the firmware through a SATA differential channel from a host to a peripheral device under the condition that the firmware is not available in the peripheral device, this status response problem must be overcame first.

SUMMARY

It is therefore one of the objectives of the claimed invention to provide a channel activating method and a peripheral device for activating the physical channel between the host and the peripheral device without the help of a microprocessor disposed in the peripheral device, to solve the above-mentioned problem.

According to a first aspect of the present invention, an exemplary peripheral device for activating a serial transmission channel to retrieve at least one firmware instruction from a host is disclosed. The exemplary peripheral device includes a serial transmission port coupled to the host, a microprocessor coupled to the serial transmission port for performing functions of the peripheral device according to the firmware instruction, a memory for holding the firmware instruction, a trigger generator for generating a trigger signal by monitoring a control signal received from the host via the serial transmission port, and a signal generator, coupled to the trigger generator, for generating an indication signal to the host via the serial transmission port according to the trigger signal to activate the serial transmission channel.

According to a second aspect of the present invention, an exemplary channel activating method applied in a peripheral device for activating a serial transmission channel to retrieve at least one firmware instruction from a host is disclosed. The peripheral device includes a serial transmission port coupled to the host, a microprocessor coupled to the serial transmission port for performing functions of the peripheral device according to the firmware instruction, and a memory for holding the firmware instruction. The exemplary channel activating method includes following steps: generating a trigger signal by monitoring a control signal received from the host via the serial transmission port, and generating an indication signal to the host via the serial transmission port according to the trigger signal to activate the serial transmission channel.

According to a third aspect of the present invention, an exemplary peripheral device for sending an indication to wake up an existing serial transmission channel between the peripheral device and a host from a power-down mode to thereby retrieve at least one firmware instruction from a host is disclosed. The exemplary peripheral device includes a serial transmission port coupled to the host, a microprocessor coupled to the serial transmission port for performing functions of the peripheral device according to the firmware instruction, a memory for holding the firmware instruction, a trigger generator for generating a trigger signal after the peripheral device is activated, and a response signal generator, coupled to the trigger generator, for generating the indication according to the trigger signal.

According to a fourth aspect of the present invention, an exemplary method for establishing a serial transmission channel between a peripheral device and a host to thereby retrieve at least one firmware instruction from a host is disclosed. The peripheral device includes a serial transmission port coupled to the host, a microprocessor coupled to the serial transmission port for performing functions of the peripheral device according to the firmware instruction, and a memory for holding the firmware instruction. The exemplary method includes following steps: providing an auxiliary apparatus coupled to the host for establishing a serial transmission channel between the host and the auxiliary apparatus, triggering the serial transmission channel between the host and the auxiliary apparatus to enter a power-down mode, replacing the auxiliary apparatus by the peripheral device so that the host and the peripheral device is coupled through the serial transmission channel, and sending an indication from one of the peripheral device and the host to the other one of the peripheral device and the host to wake up the serial transmission channel.

These and other objectives of the present invention will no doubt become obvious to those of ordinary skill in the art after reading the following detailed description of the preferred embodiment that is illustrated in the various figures and drawings.

DETAILED DESCRIPTION

Please note that, for simplicity, a host and a peripheral device provided below in any embodiment are serial advanced technology attachment (SATA) standards compliant apparatus, and the indication is structured as a Frame Information Structure (FIS). Further, an optical disc drive is adopted here as an example of the peripheral device. However, these are not meant to be limitations of the present invention. The present invention is capable of being applied to any serial transmission channel, such as USB, SAS, etc., between a host and a peripheral device.

Figure 4:
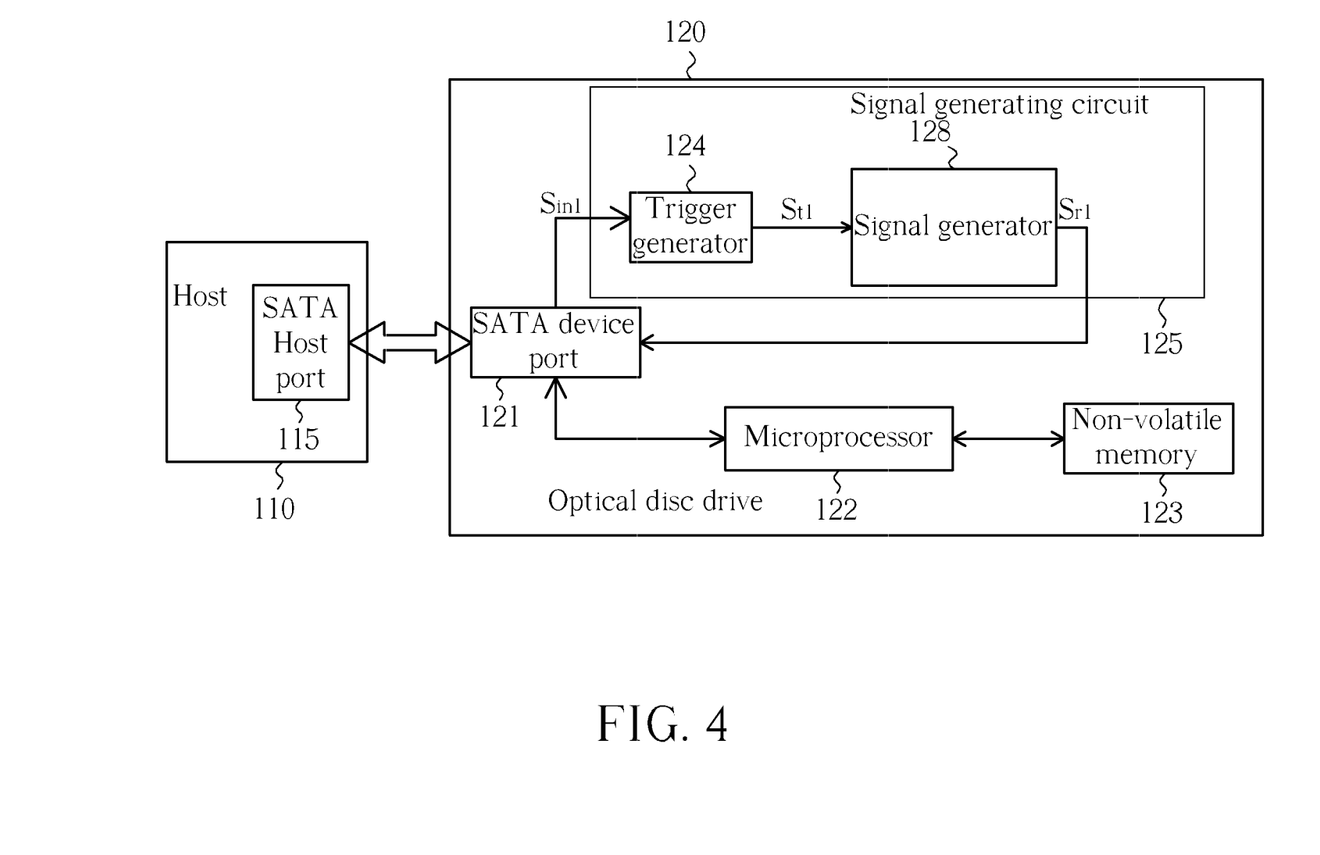
FIG. 4 is a block diagram of an optical disc drive according to a first embodiment of the present invention.

Referring to FIG. 4, which is a block diagram of an optical disc drive 120 according to a first embodiment of the present invention. The optical disc drive 120 includes a SATA device port 121, a microprocessor 122, a non-volatile memory 123, and a signal generating circuit 125. The signal generating circuit 125 comprises a trigger generator 124 and a signal generator 128. Additionally, the optical disc drive 120 is further coupled to a host 110 through a SATA cable. The host 110 has a SATA host port 115 used to communicate with the SATA device port 121 of the optical disc drive 120. In this embodiment, the optical disc drive 120 does not yet have any firmware in the non-volatile memory 123, or the firmware malfunctions. And the host 110 is attempting to establish and activate the serial transmission channel between the host 110 and the optical disc drive 120 so that firmware can be installed or updated in the non-volatile memory 123. After that, the microprocessor 122 can function normally to control operation of the optical disc drive 120 by executing the firmware installed in the non-volatile memory 123. Please note that the present invention could be utilized to install or update the firmware into the non-volatile memory 123 by any other hardware (not shown) without any help from the microprocessor 122. Since these methods are known to those skilled in the art, further description is omitted here for brevity.

The serial transmission channel is a SATA differential channel in the present embodiment but can be any other kind of serial transmission channel in other embodiments. During a channel establishment procedure, the host 110 sends a control signal $S_{in1}$ to the signal generating circuit 125 through the SATA host port 115 and the SATA device port 121. The trigger generator 124 of the signal generating circuit 125 monitors the control signal $S_{in1}$ and is able to identify a plurality of reset signals: COMRESET, SOFTWARERESET, DEVICE RESET and EXECUTE DEVICE DIAGNOSTIC. In this embodiment, the trigger generator 124 is a timer and the timer starts when identifying one of the above-listed reset signals. In addition, the control signal $S_{in1}$ is a COMRESET signal in the present embodiment for illustrative purpose. The trigger generator 124 generates a trigger signal $S_{t1}$ when the trigger generator 124 expires.

In another embodiment, the trigger generator 124 can also detect a Phy Ready state of the optical disc drive 120 after the input signal $S_{in1}$ is inputted into the optical disc drive 120. Once the Phy Ready state is detected, the trigger generator 124 starts to track the time of a predetermined period and then generates the trigger signal $S_{t1}$ when the trigger generator 124 expires.

The trigger signal $S_{t1}$, generated due to the detection of the reset signal (COMRESET, SOFTWARERESET, DEVICE RESET or EXECUTE DEVICE DIAGNOSTIC) or the Phy Ready state, is then inputted into the signal generator 128 to generate an indication $S_{r1}$. The indication $S_{r1}$ is sent to the host 110 through the SATA host port 115 and the SATA device port 121. The indication $S_{r1}$ is used to transmit a Register Frame Information Structure (Register FIS) and a content of the Register FIS corresponds to a GOOD status or a BAD status. The GOOD status or the BAD status informs the host 110 of a state of the SATA differential channel and then the host 110 can send requests to the optical disc drive 120 after acknowledging the state of the SATA differential channel via the received Register FIS. Here, definitions of the above-mentioned reset signals, the Phy Ready state, GOOD status, and BAD status comply with SATA standards and further description is omitted here for brevity.

Figure 5:
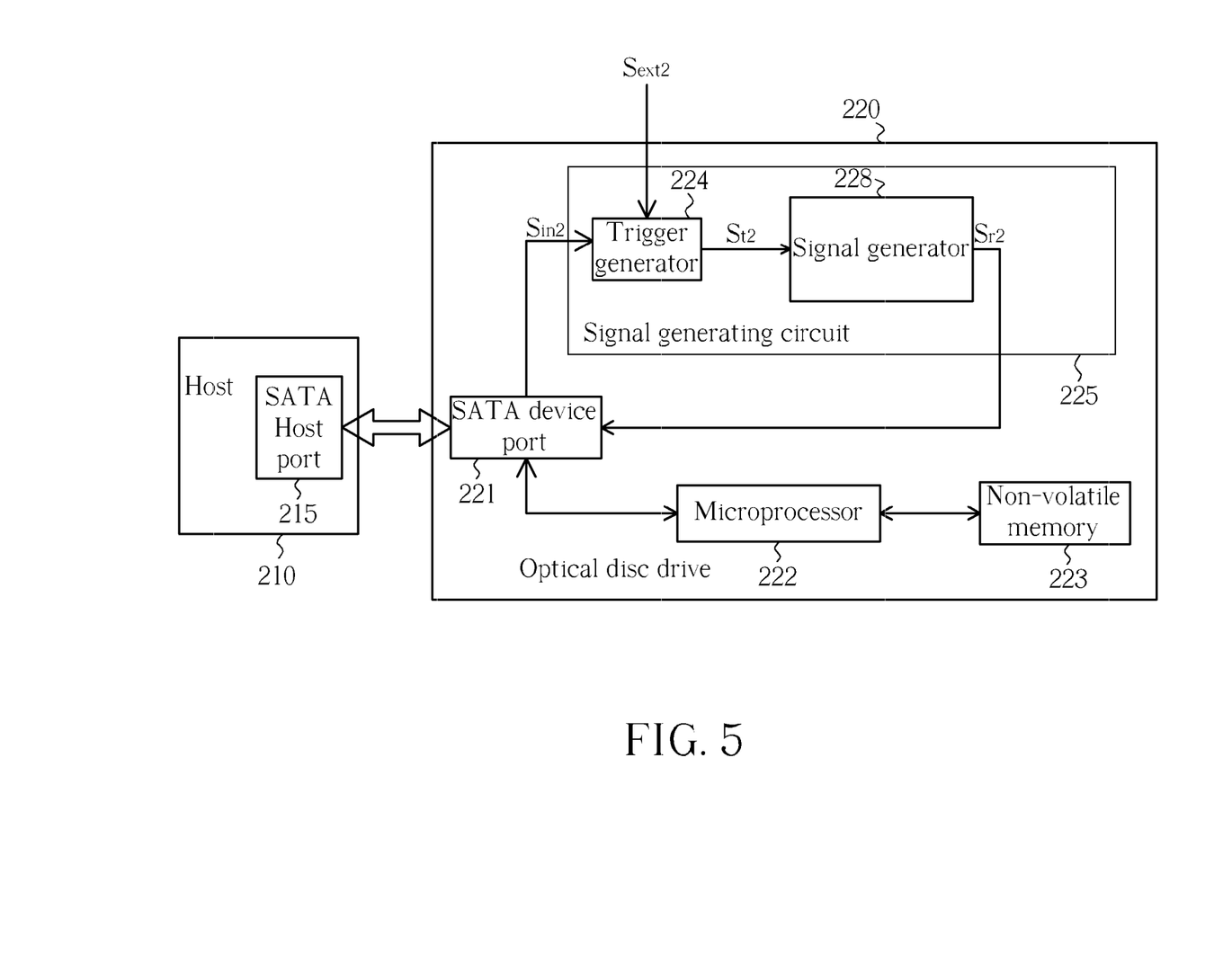
FIG. 5 is a block diagram of an optical disc drive according to a second embodiment of the present invention.

Referring to FIG. 5, which is a block diagram of an optical disc drive 220 according to a second embodiment of the present invention. The optical disc drive 220 includes a SATA device port 221, a microprocessor 222, a non-volatile memory 223, and a signal generating circuit 225. The signal generating circuit 225 comprises a trigger generator 224 and a signal generator 228. Additionally, the optical disc drive 220 is further coupled to a host 210 through a SATA cable. The host 210 has a SATA host port 215 used to communicate with the SATA device port 221 of the optical disc drive 220. The functionality and operation of the optical disc drive 220 is similar to that of the above-mentioned optical disc drive 120 except that the operation of the trigger generator 224 differs and this difference is detailed as follows.

During the channel establishment procedure, the host 210 sends a control signal $S_{in2}$ to the trigger generator 224 of the signal generating circuit 225 through the SATA host port 215 and the SATA device port 221. The trigger generator 224 monitors the control signal $S_{in2}$ and is able to identify a plurality of reset signals: COMRESET, SOFTWARERESET, DEVICE RESET and EXECUTE DEVICE DIAGNOSTIC. When identifying one of the reset signals, the trigger generator 224 is enabled and allowed to receive an external trigger signal $S_{ext2}$. The trigger generator 224 generates a trigger signal $S_{t2}$ when the external trigger signal $S_{ext2}$ transmits a trigger to the trigger generator 224. In another embodiment, the trigger generator 224 can also detect a Phy Ready state of the optical disc drive 220 after the control signal $S_{in2}$ is inputted into the optical disc drive 220. Once the Phy Ready state is detected, the trigger generator 220 is enabled and allowed to receive an external trigger signal $S_{ext2}$. Please note that it is the control signal $S_{in2}$ that is the cause of the optical disc drive 220 being able to enter the Phy Ready state.

The trigger signal $S_{t2}$, generated, due to the trigger of the external trigger signal $S_{ext2}$, is then inputted into the signal generator 228 to generate an indication $S_{r2}$. The indication $S_{r2}$ is sent to the host 210 through the SATA host port 215 and the SATA device port 221. The indication $S_{r2}$ transmits a Register FIS and a content of the Register FIS corresponds to a GOOD status or a BAD status. The GOOD status or the BAD status informs the host 210 of a state of the SATA differential channel and then the host 210 can send requests to the optical disc drive 220 after acknowledging the state of the SATA differential channel. Here, definitions of the above-mentioned reset signals, the Phy Ready state, GOOD status, and BAD status comply with SATA standards and further description is omitted here for brevity.

Figure 6:
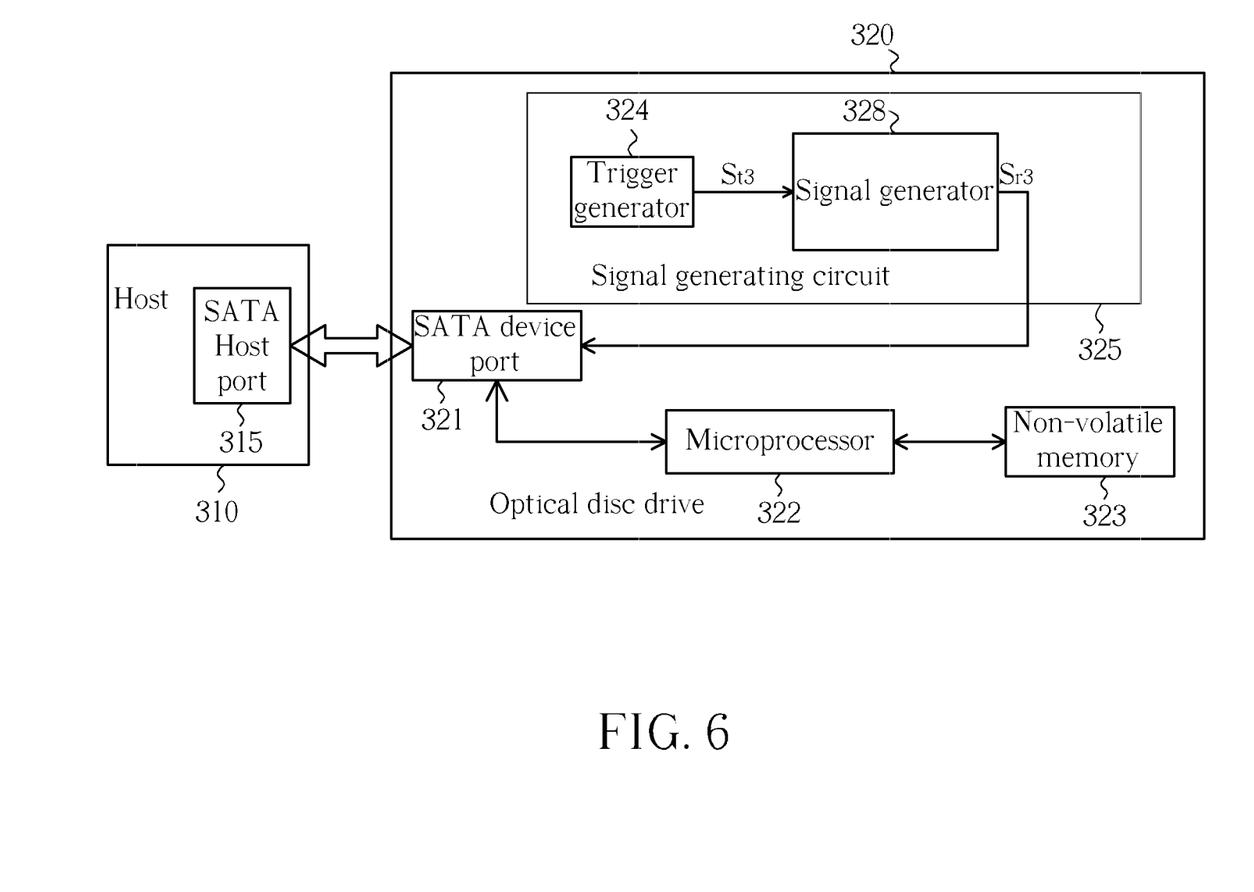
FIG. 6 is a block diagram of an optical disc drive according to a third embodiment of the present invention.

Referring to FIG. 6, which is a block diagram of an optical disc drive 320 according to a third embodiment of the present invention. The optical disc drive 320 includes a SATA device port 321, a microprocessor 322, a non-volatile memory 323, and a signal generating circuit 325. The signal generating circuit 325 comprises a trigger generator 324 and a signal generator 328. Additionally, the optical disc drive 320 is further coupled to a host 310 through a SATA cable. The host 310 has a SATA host port 315 used to communicate with the SATA device port 321 of the optical disc drive 320. The optical disc drive 320 has no firmware in the non-volatile memory 323, or the firmware malfunctions. The optical disc drive 320 is attempting to wake up the existing serial transmission channel between the host 310 and the optical disc drive 320 from a power-down mode so that firmware can be installed or updated in the non-volatile memory 323. After that, the microprocessor 322 can function normally to control operation of the optical disc drive 320 by executing the firmware installed in the non-volatile memory 323. Please note that the present invention could be utilized to install or update the firmware into the non-volatile memory 323 by any other hardware (not shown) without any help from the microprocessor 322. Since these methods are known to those skilled in the art, further description is omitted here for brevity.

The serial transmission channel is a SATA differential channel in the present embodiment but can be any other kind of serial transmission channel in other embodiments. The power-down mode of the SATA differential channel is entered by using an auxiliary optical disc drive (not shown) having firmware. That is, before the target optical disc drive 320 having no firmware is coupled to the host 310, an auxiliary optical disc drive having firmware is coupled to the host 310. Since the auxiliary optical disc drive has firmware, it can successfully offer a state of the SATA differential channel to the host 310 utilizing firmware. After the host 310 receives the state of the SATA differential channel provided by the auxiliary optical disc drive, the SATA differential channel is deemed successfully established. Then, according to SATA standards, either the host 310 or the auxiliary optical disc drive is allowed to ask the counterpart to enter the power-down mode. Because the SATA differential channel is suspended in a power-down mode, one can freely decouple the host 310 and the auxiliary optical disc drive without terminating the SATA differential channel.

Finally, the optical disc drive 320, having no firmware, is coupled to the host 310. It is the above-mentioned procedure that causes the SATA differential channel between the host 310 and the optical disc drive 320 to be in a power-down mode. In this embodiment, the trigger generator 324 of the signal generating circuit 325 is a timer and the timer starts to track the time of a predetermined period when the optical disc drive 320 is powered on. When expiring, the trigger generator 324 generates a trigger signal $S_{t3}$ accordingly. In another embodiment, the optical disc drive 320 may generate a control signal to the trigger generator 324. For example, when a Phy Ready state is detected, the control signal is delivered to inform the trigger generator 324 of this detected state. The trigger generator 324 then generates the trigger signal $S_{t3}$ accordingly. Please note that the above-mentioned timing for the timer to start is only an example and not meant to be a limitation of the present invention. The trigger signal $S_{t3}$ is then inputted into the signal generator 328 to generate an indication $S_{r3}$. The indication $S_{r3}$ is sent to the host 310 through the SATA host port 315 and the SATA device port 321. In this embodiment, the indication $S_{r3}$ transmits a COMWAKE signal to wake up the existing SATA differential channel to enter a power-on mode. Once the SATA differential channel enters the power-on mode, the host 310 can start sending requests to the optical disc drive 320. Here, definitions of the above-mentioned COMWAKE signal, power-down mode, and power-on mode comply with SATA standards and further description is omitted here for brevity.

Figure 7:
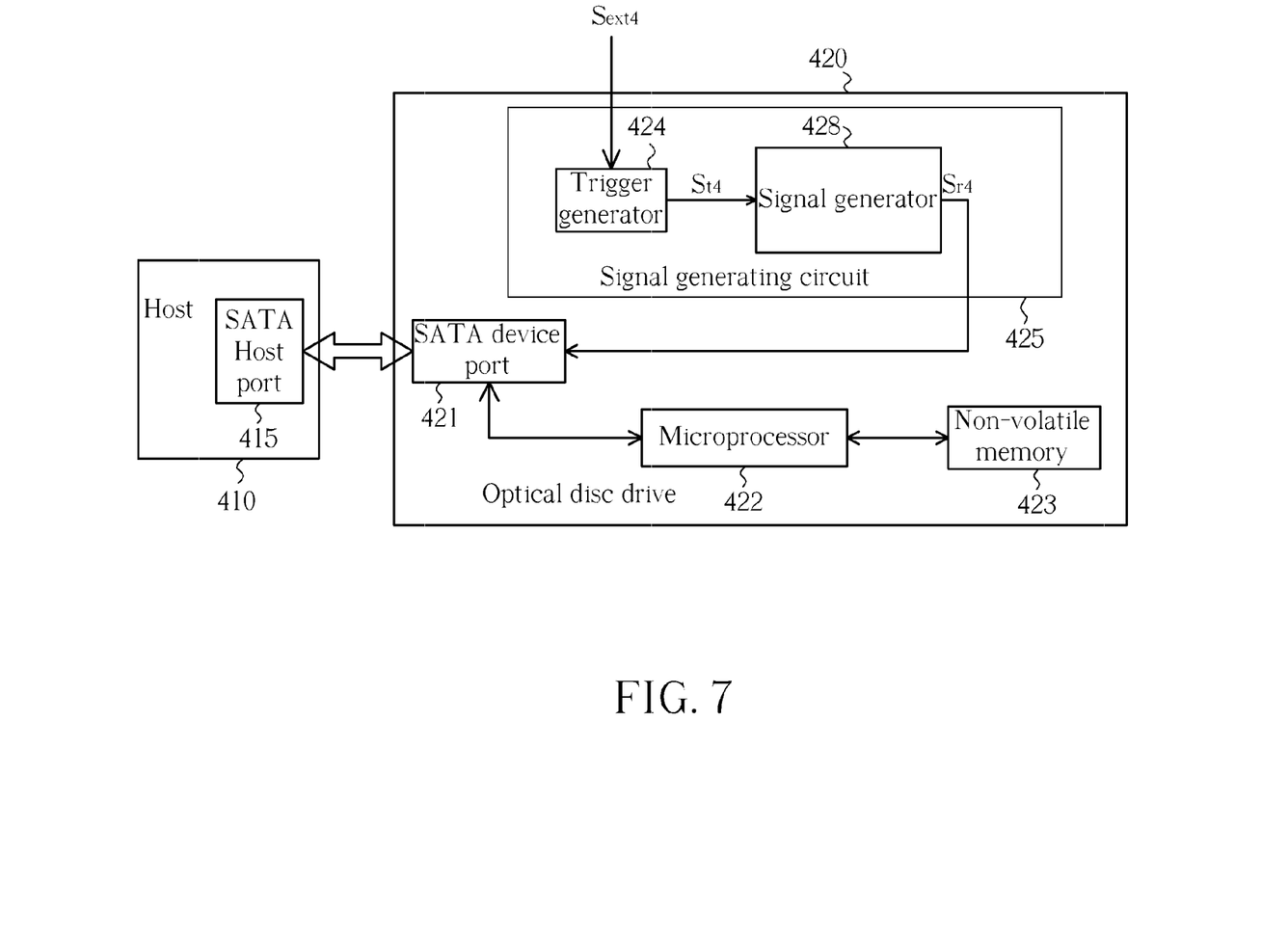
FIG. 7 is a block diagram of an optical disc drive according to a fourth embodiment of the present invention.

Referring to FIG. 7, which is a block diagram of an optical disc drive 420 according to a fourth embodiment of the present invention. The optical disc drive 420 includes a SATA device port 421, a microprocessor 422, a non-volatile memory 423, and a signal generating circuit 425. The signal generating circuit 425 comprises a trigger generator 424 and a signal generator 428. Additionally, the optical disc drive 420 is further coupled to a host 410 through a SATA cable. The host 410 has a SATA host port 415 used to communicate with the SATA device port 421 of the optical disc drive 420. The functionality and operation of the optical disc drive 420 is similar to that of the optical disc drive 320 except the operation of the trigger generator 424 is different and those differences are detailed as follows.

The power-down mode of the SATA differential channel is entered by using an auxiliary optical disc drive (not shown) having firmware. Then, the optical disc drive 420, having no firmware, is coupled to the host 410 for replacing the auxiliary optical disc drive. It is the above-mentioned procedure that causes the SATA differential channel between the host 410 and the optical disc drive 420 to be in a power-down mode. The trigger generator 424 of the signal generating circuit 425 is used for receiving an external trigger signal $S_{ext4}$ and the trigger generator 424 generates a trigger signal $S_{t4}$ when the external trigger signal $S_{ext4}$ transmits a trigger inputted to the trigger generator 424. In another embodiment, the trigger generator 424 is also enabled by a control signal and then can receive the external trigger signal $S_{ext4}$. For example, when a Phy Ready state is detected, the control signal is delivered to inform the trigger generator 324 of this detected state, thereby allowing the trigger generator 424 to receive the external trigger signal $S_{ext4}$. The trigger signal $S_{t4}$ is then inputted into the signal generator 428 to generate an indication $S_{r4}$ that transmits a COMWAKE signal to wake up the SATA differential channel to enter a power-on mode. The indication $S_{r4}$ is sent to the host 410 through the SATA host port 415 and the SATA device port 421. Once the SATA differential channel enters the power-on mode, the host 410 can start sending requests to the optical disc drive 420. Here, definitions of the above-mentioned COMWAKE signal, power-down mode, and power-on mode comply with SATA standards and further description is omitted here for brevity.

Figure 8:
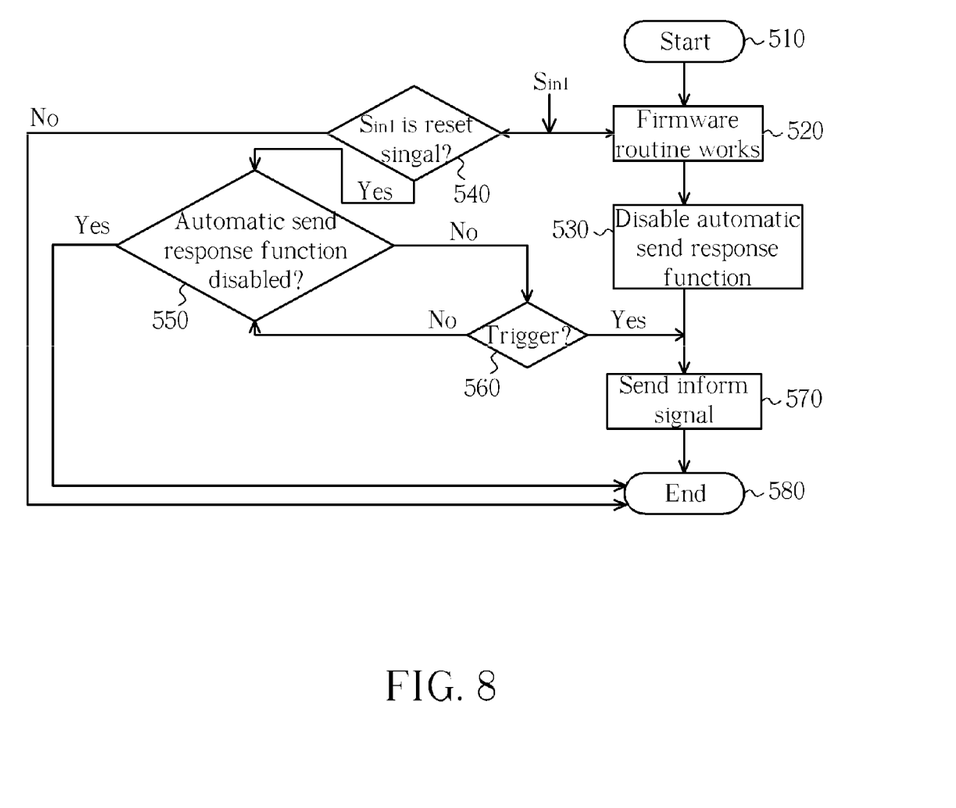
FIG. 8 is a flow chart illustrating the operation of an optical disc drive utilizing an automatic send response function according to an embodiment of the present invention.

As mentioned above, the present invention can automatically activate a serial transmission channel between a host and a peripheral device. When the serial transmission channel between the host and the peripheral device has been successfully activate, the host can install the firmware designed for the peripheral device into the non-volatile memory of the peripheral device via the physical channel. However, since running the firmware is capable of replying the device status to the host for completing the channel establishment, the above automatic send response function can be disabled after the firmware has been installed into the peripheral device. Please refer to FIG. 8. FIG. 8 is a flow chart of utilizing the automatic send response function according to an embodiment of the present invention. As shown in FIG. 4, when powered on (Step 510), the optical disc drive 120 starts receiving a control signal $S_{in1}$ from the host 110 through the SATA host port 115 and the SATA device port 121. The trigger generator 124 examines the incoming control signal $S_{in1}$ to check if the control signal $S_{in1}$ is one of the reset signals: COMRESET, SOFTWARERESET, DEVICE RESET and EXECUTE DEVICE DIAGNOSTIC (Step 540). If the control signal $S_{in1}$ is not one of the reset signals, the trigger generator 124 ignores the control signal $S_{in1}$, and then proceeds to Step 580. On the other hand, if the control signal $S_{in1}$ is one of the reset signals, the trigger generator 124 further checks whether the automatic send response function is disabled or not disabled (Step 550). If the automatic send response function has been disabled, the trigger generator 124 ignores the control signal $S_{in1}$, and then proceeds to Step 580. On the other hand, if the automatic send response function is not disabled, the trigger generator 124 generates a trigger signal $S_{t1}$ at appropriate timing (Step 560). According to the trigger signal $S_{t1}$, an indication $S_{r1}$ will be generated by the signal generator 128 and outputted to the host 110 (Step 570).

On the other hand, if the firmware designed for the optical disc drive 120 has been installed into the optical disc drive 120, the optical disc drive 120 is capable of performing its functionality by running the installed firmware in the non-volatile memory 123. Under this condition, the control signal $S_{in1}$ is processed according to the running firmware instead of the automatic send response function (Step 520). Then, the running firmware will disable the automatic send response function (Step 530). Therefore, the firmware now is responsible for replying an indication to the host 110 in response to the control signal $S_{in1}$. Please note that, the flow shown in FIG. 8 is applicable to other embodiments such that an optical disc drive will disable the automatic send response function when firmware is installed in the optical disc drive.

Figure 9:
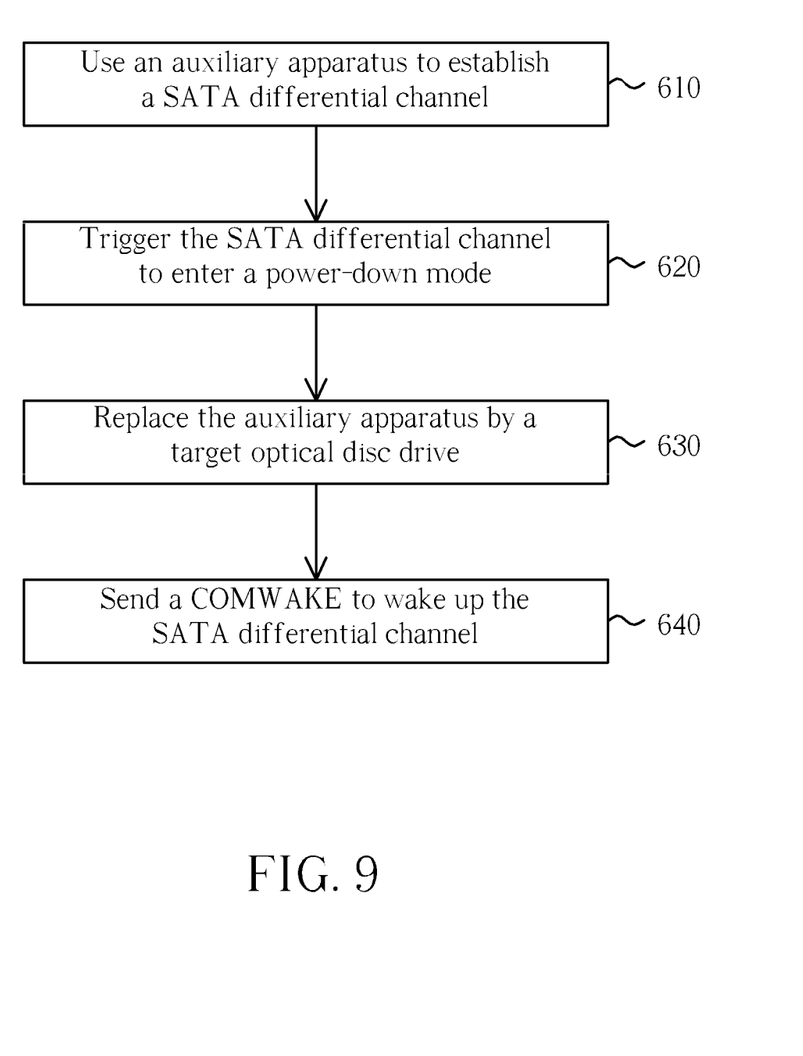
FIG. 9 is a flow chart illustrating a method according to an embodiment of the present invention.

Please refer to FIG. 9. FIG. 9 is a flow chart illustrating a method according to an embodiment of the present invention. The method is for activating a physical channel between a host and a peripheral device. The peripheral device has no firmware installed. The physical channel is a SATA differential channel in the present embodiment but the physical channel can be any other kind of serial transmission channel in other embodiments. Please note that the method does not utilize a REGISTER FIS to send state information between the host and the peripheral device. For illustration, an optical disc drive is adopted as the peripheral device. Each step of the method is detailed as follows:

Step 610: An auxiliary optical disc drive having firmware is utilized and is coupled to a host. The auxiliary optical disc drive utilizes the firmware to establish a SATA differential channel between the host and the auxiliary optical disc drive.

Step 620: Trigger the SATA differential channel between the host and the auxiliary apparatus to enter a power-down mode by either the host or the auxiliary optical disc drive.

Step 630: Decouple the host and the auxiliary optical disc drive and then couple the host with a target optical disc drive having no firmware through the SATA differential channel. Because the SATA differential channel is suspended in a power-down mode, one can freely decouple the host and the auxiliary optical disc drive without terminating the SATA differential channel. After the target optical disc drive is powered on, the target optical disc drive and the host are now in power-down mode and the SATA differential channel between the target optical disc drive and the host is suspended.

Step 640: Either the host or the target optical sends a COMWAKE signal to wake up the SATA differential channel to enter a power-on mode. As a result, a SATA differential channel between the host and the target optical disc drive having no firmware is established successfully.

The claimed invention provides a signal generating circuit and related method for activating a serial transmission channel between a host and a peripheral device under a condition of the peripheral device not utilizing firmware. In this way, the firmware can be written into a non-volatile memory through the activated serial transmission channel. Compared to a conventional method of writing the firmware into the non-volatile memory in advance utilizing a ROM writer before installing the non-volatile memory on a circuit board, the signal generating circuit and related method of the claimed invention save a lot of time and mass production cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A peripheral device for activating a serial transmission channel to retrieve at least one firmware instruction from a host, comprising:
    a serial transmission port coupled to the host;
    a microprocessor coupled to the serial transmission port for performing functions of the peripheral device according to the firmware instruction;
    a memory for holding the at least one firmware instruction;
    a trigger generator for generating a trigger signal by monitoring a control signal received from the host via the serial transmission port; and
    a signal generator, coupled to the trigger generator, for generating an indication signal to the host via the serial transmission port according to the trigger signal to activate the serial transmission channel, wherein the signal generator is a hardware, and the memory has not the at least one firmware instruction, or the at least one firmware instruction held by the memory malfunctions before the indication signal is sent to the host.

2. The peripheral device of claim 1, wherein the trigger generator comprises a timer, the timer starts when receiving the control signal, and the trigger generator generates the trigger signal when the timer expires.

3. The peripheral device of claim 1, wherein the trigger generator further receives an external trigger signal, and when the trigger generator is enabled by the control signal, the trigger generator is triggered by the external trigger signal to output the trigger signal.

4. The peripheral device of claim 1, wherein the serial transmission channel complies with SATA protocols.

5. The peripheral device of claim 4, wherein the control signal is selected from the group comprising a COMRESET signal, a SOFTWARERESET signal, a DEVICE RESET signal and an EXECUTE DEVICE DIAGNOSTIC signal.

6. The peripheral device of claim 4, wherein the trigger generator outputs the trigger signal when the SATA differential channel enters a Phy Ready state.

7. The peripheral device of claim 4, wherein the indication signal is a Register Frame Information Structure (Register FIS).

8. The peripheral device of claim 7, wherein a content of the Register FIS corresponds to a GOOD status or a BAD status.

9. The peripheral device of claim 4, wherein the SATA differential channel is in a power-down mode.

10. The peripheral device of claim 9, wherein the indication signal is a COMWAKE signal utilized to wake up the SATA differential channel.

11. The peripheral device of claim 10, wherein the SATA differential channel is first established between the host and an auxiliary apparatus having firmware, and then the auxiliary apparatus is replaced by the peripheral device after the established SATA differential channel enters the power-down mode.

12. A channel activating method applied in a peripheral device for activating a serial transmission channel to retrieve at least one firmware instruction from a host, the peripheral device comprising a serial transmission port coupled to the host, a microprocessor coupled to the serial transmission port for performing functions of the peripheral device according to the firmware instruction, and a memory for holding at least one the firmware instruction; the channel activating method comprising:
generating a trigger signal by monitoring a control signal received from the host via the serial transmission port; and
generating an indication signal to the host via the serial transmission port by a hardware according to the trigger signal to activate the serial transmission channel, wherein the memory has not the at least one firmware instruction, or the at least one firmware instruction held by the memory malfunctions before the indication signal is sent to the host.

13. The channel activating method of claim 12, wherein the trigger signal is generated when a predetermined period of time starting from the reception of the control signal expires.

14. The channel activating method of claim 12, wherein the trigger signal is generated once both the control signal and an external trigger signal are received.

15. The channel activating method of claim 12, wherein the serial transmission channel complies with SATA protocols.

16. The channel activating method of claim 15, wherein the control signal is selected from the group comprising a COMRESET signal, a SOFTWARERESET signal, a DEVICE RESET signal and an EXECUTE DEVICE DIAGNOSTIC signal.

17. The channel activating method of claim 15, wherein the trigger signal is generated when the SATA differential channel enters a Phy Ready state.

18. The channel activating method of claim 15, wherein the indication signal is a Register Frame Information Structure (Register FIS).

19. The channel activating method of claim 18, wherein a content of the Register FIS corresponds to a GOOD status or a BAD status.

20. The channel activating method of claim 15, wherein the SATA differential channel is in a power-down mode.

21. The channel activating method of claim 20, wherein the indication signal is a COMWAKE signal to wake up the SATA differential channel.

22. The channel activating method of claim 21, further comprising:
providing an auxiliary apparatus coupled to the host for establishing the SATA differential channel between the host and the auxiliary apparatus;
triggering the SATA differential channel between the host and the auxiliary apparatus to enter a power-down mode; and
replacing the auxiliary apparatus by the peripheral device so that the host and the peripheral device is coupled through the serial transmission channel.

23. A peripheral device for sending an indication to wake up an existing serial transmission channel between the peripheral device and a host from a power-down mode, thereby to retrieve at least one firmware instruction from a host, the peripheral device comprising:
a serial transmission port coupled to the host;
a microprocessor coupled to the serial transmission port for performing functions of the peripheral device according to the firmware instruction;
a memory for holding the firmware instruction;
a trigger generator for generating a trigger signal after the peripheral device is activated; and
a response signal generator, coupled to the trigger generator, for generating the indication according to the trigger signal, wherein the existing serial transmission channel is pre-established through the host and an auxiliary apparatus, and the auxiliary apparatus is replaced with the peripheral device after the existing serial transmission channel is in a power-down mode.

24. The peripheral device of claim 23, wherein the trigger generator is a timer, the timer generates the trigger signal when the timer expires.

25. The peripheral device of claim 23, wherein the trigger generator further receives an external trigger signal and the trigger generator outputs the trigger signal when receiving the external trigger signal.

26. The peripheral device of claim 23, wherein the serial transmission channel is a Serial Advanced Technology Attachment (SATA) differential channel complied with SATA protocols.

27. The peripheral device of claim 26, wherein the indication is a COMWAKE signal utilized for waking up the SATA differential channel to enter a power-on mode.

28. A method for establishing a serial transmission channel between a peripheral device and a host, thereby to retrieve at least one firmware instruction from a host, the peripheral device comprising a serial transmission port coupled to the host, a microprocessor coupled to the serial transmission port for performing functions of the peripheral device according to the firmware instruction, and a memory for holding the firmware instruction; said method comprising:

providing an auxiliary apparatus coupled to the host for establishing a serial transmission channel between the host and the auxiliary apparatus;

triggering the serial transmission channel between the host and the auxiliary apparatus to enter a power-down mode;

replacing the auxiliary apparatus by the peripheral device so that the host and the peripheral device is coupled through the serial transmission channel; and sending an indication from one of the peripheral device and the host to the other one of the peripheral device and the host to wake up the serial transmission channel.

29. The method of claim 28, wherein the serial transmission channel complies with SATA protocols.

30. The method of claim 29, wherein the indication is a COMWAKE signal to wake up the SATA differential channel to enter a power-on mode.

\* \* \* \* \*